MAGNETIC RECORDING OF MUSICAL TONES EMPLOYING
A MAGNETIC PATTERN DIE

Filed Aug. 26, 1968

INVENTOR.
ABRAHAM H. FRISCH

BY Thomas B. Graham
ATTORNEY

United States Patent Office
3,539,697
Patented Nov. 10, 1970

3,539,697
MAGNETIC RECORDING OF MUSICAL TONES EMPLOYING A MAGNETIC PATTERN DIE

Abraham H. Frisch, 320 E. 53rd St., New York, N.Y. 10022

Filed Aug. 26, 1968, Ser. No. 755,329
Int. Cl. G10h *3/04;* G10d *17/00*
U.S. Cl. 84—1.02 8 Claims

ABSTRACT OF THE DISCLOSURE

A regularly serrated, or otherwise marked, magnetizable metal strip held in a track over which is passed a recording tape and a permanent magnet, relative motion being developed between the magnet and tape to provide a magnetic pattern recorded on the tape, corresponding to musical tones, which recording is playable on standard playback apparatus.

BACKGROUND OF THE INVENTION

The present invention relates to the production and recording of musical sounds, notes, tones, chords and patterns and, more especially, to a method of and means for artificially producing simple and composite notes or tones and impressing or recording the same in any desired spacing or sequence upon a magnetic tape so that the same may thereafter be reproduced on a playback machine.

In accordance with the present invention, I have discovered how to embody or represent in a simple device any desired musical tone, note or sound, whether simple or composite, and to impress or record the same magnetically in any desired sequential pattern or order on a magnetic recording tape whereby the tones, notes, chords and patterns so recorded can be reproduced at any time by a standard or conventional playback machine. In further accordance with my invention, I have made it possible to synthesize and record through a manual procedure involving only simple magnetic devices any note, tone, chord or pattern whatever. Such is useful in the teaching of music, harmonics, rhythm and related subjects and for the artificial creation of all types of musical sounds and patterns which can then be reproduced by passing the magnetic tapes with the recordings thereon through standard playback machines. In this way, for example, I may achieve, synthetically or artificially, tones and notes similar to various musical instruments, such as the clarinet, oboe and cello, and simpler types of tones or notes, such as those produced by drums.

My invention is predicated upon the discovery that a simple and inexpensive die can be made for each desired note or tone and that the note or tone represented by each such die can be magnetically recorded on a tape. I have, in this connection, produced a considerable number of dies each of which corresponds to a particular note on the piano. The note or tone involved by a particular die is a function of the relative movement between the die, tape and magnet. Each die may be such that it represents a single note or tone the duration of which is controlled by the length or developed length, of the die and the speed at which the tape is driven for playback purposes. Since the standard speed for running such magnetic tape is 15 inches per second, such is understood as incorporated herein by reference but other speeds may be utilized with proportionate effects upon duration and pitch of tone. It is important for faithful playback that the tape speed at playback be the same as that used for recording.

My invention also comprehends a simple method or procedure which can be carried out substantially manually and which is characterized by the fact that it needs no elaborate mechanism or source of electric current. The invention is carried out through the utilization of the forces of magnetism and a mechanical device for the tape.

DETAILED DESCRIPTION OF THE INVENTION

The fundamental element of the invention is the combination of a small permanent magnet, a magnetic tape for recording, a magnetic pattern die in an arrangement to complete a magnetic circuit from magnet to die providing relative motion between the tape and the magnetic pattern produced.

Details of the structure and practice of the invention can be obtained by references to the accompanying drawing wherein certain typical embodiments of the invention are shown as follows.

The details of relationship of the configuration of the source of patterns and the configuration of the element are shown in greater detail in the specification.

Figure 1:
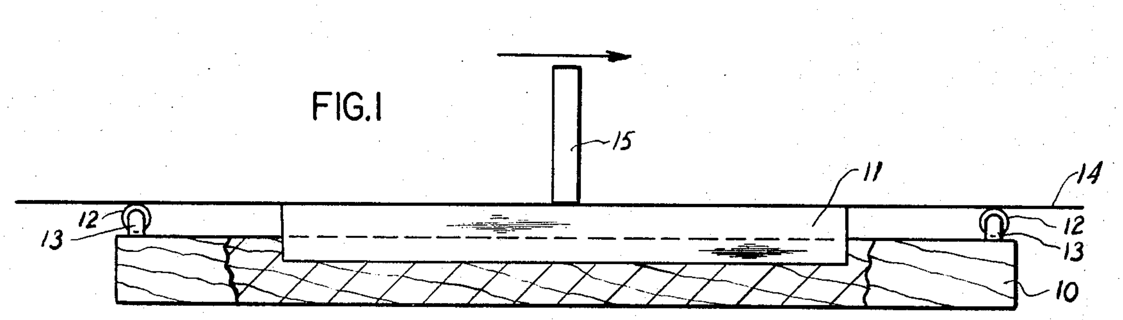
FIG. 1 is a sectional view of an apparatus corresponding to the invention showing the assemblage just prior to the recording of the tone on the magnetic tape.
Figure 2:
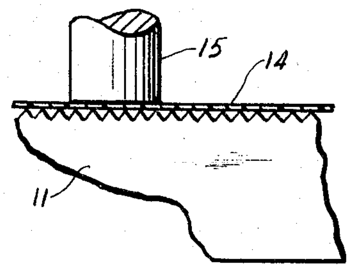
FIG. 2 is like FIG. 1, but enlarged to show a section made in the recording of a note or tone.

Referring now to the drawings, in FIG. 1, base 10 represents a non-magnetic insulating base, which for convenience here is shown composed of wood, but may be of any other material, natural or synthetic, provided it is an insulating or non-magnetic material. The size, the shape and the thickness of base 10 are not critical, except that its length should be sufficient to provide a tone long enough for the particular recording purposes in view and its mass should be enough to provide the necessary insulation and form a suitable support for the tone pattern maker 11, or magnetic die, which is of magnetic material and is fitted into a groove in the upper face of the insulating base 10. The member 11 may be essentially flush with the upper surface of the insulating base 10, or may project above the surface. In view of the improved recording which this apparatus and method provides the important aspect of the placement of member 11 is to have it in position to complete a magnetic circuit in proper relation with the upper surface of its support.

The member 11 is the basis for completing the magnetic circuit involved in the recording act itself. Hence, magnetic pattern member 11 may be any suitable or desired metal or alloy having a high magnetic premeability with a low hysteresis. This is essential for recording. The low hysteresis makes it possible to utilize the element over and over within short intervals of time. The base 10 may also be provided with supporting rolls 12 held in suitable upstanding brackets or bearings 13 mounted on the base so as to hold the magnetic tape 14 in an appropriate position for handling directly over the magnetic pattern member 11. Mechanical movement to move the tape through the die may be any conventional form and hence is not shown.

The tape 14 may be of any suitable or known type used for recording purposes and generally the Scotch brand magnetic recording tapes are suitable. For multi-track recording the 35 millimeter magnetic tape formed as a long strip in a roll or in an endless loop is suitable. It is apparent also that the tape when used in a strip form may be converted into an endless loop by sealing the ends together, using any of the commonly known available adhesives for the purpose. The application of the magnetic pattern to the tape can be done by any convenient manual or mechanical means.

The particular note or tone involved in the recording is developed by the magnetic pattern member 11. Virtually any symmetrical repetitive cut transverse to the axis of the element is useful. I have discovered that these magnetic members 11, or the dies, may be made by utilizing machine screws or threaded rods of appropriate magnetizable material. The resultant magnetic pattern recorded in the tape produces musical notes or tones which depend upon three variables, namely:

(1) The pitch of the thread of the screw, that is the distance from the high point on one thread of the screw to the corresponding high point of the adjacent thread measured parallel to the axis;

(2) The form and shape of the thread of the screw, and (3) The speed of the tape playback.

To complete the magnetic circuit for a recording, therefore, the magnetic tape 14 is placed over the magnetic pattern member assemblage and the permanent magnet 15 is drawn manually or mechanically at a uniform rate of movement along the length of the magnetic pattern member to develop a recorded pattern in the tape. For multi-track recording it is necessary to provide a guide which will keep the relationship of the permanent magnet 15 to the pattern member 11 sufficiently precise to avoid cross talk.

The particular note or tone involved can be reproduced by a die made up essentially of the magnetic pattern member 11 which has the upper surface thereof provided with a series of regularly spaced transversely disposed configurations of substantially equal height or depth. Then the magnetic pattern member held in the base provides the magnetic system for applying a pattern to a tape. Where the magnetic pattern member 11 is a rod, for example, a threaded rod cut with ordinary screw threads, the magnetization is carried out by mounting the rod in the groove to hold it steady, placing the recording tape over the magnetic pattern rod and, thereafter, moving the permanent magnet 15 uniformly along the length of the rod over the tape completing a circuit from the magnet to the rod. Movement of the magnet is indicated in the drawing by an arrow. The tape takes up the configuration and there is recorded in the tape in a track a magnetic pattern reproducible as a musical note having a pitch based on the spacing of the threads with tonal harmonics depending on the configuration of the threads themselves. The entire operation, of course, must be related to a particular speed of tape playback and for this purpose I have assumed that this speed of playback will be 15 inches per second, although any other speed can be worked out.

A convenient method of labelling the fundamental musical tones in the equal tempered tuning system is by reference to a standard 88 note piano and numbering the white and black keys from the lowest key on the piano upwards from 1 to 88. The following tabulation is a chart showing the pitch of thread necessary for the various tones related to piano fundamental frequencies, assuming a tape playback speed of 15 inches per second. The pitches for fundamental frequencies above 64 can be similarly computed.

TABLE

| Noto of Piano | Standard frequency of fundamontal tone | Pitch of thread, inches at 15"/sec. |
|---|---|---|
| 64 C | 1046. 502 | .0143 |
| 64 B | 987. 767 | .0151 |
| 62 Bb | 932. 328 | .0160 |
| 61 A | 880. 000 | .0170 |
| 60 Ab | 830. 609 | .0180 |
| 59 G | 783. 991 | .0191 |
| 58 A# | 739. 989 | .0202 |
| 57 F | 698. 456 | .0214+ |
| 56 E | 659. 255 | .0227+ |
| 55 Eb | 622. 254 | .0240 |
| 54 D | 587. 330 | .0255 |
| 53 C# | 554. 365 | .0270 |
| 52 C | 523. 251 | .0286 |
| 51 B | 493. 883 | .0304 |
| 50 Bb | 466. 164 | .0321 |
| 49 A | 440. 000 | .0340 |
| 48 Ab | 415. 305 | .0361 |
| 47 G | 391. 995 | .0382 |
| 46 F# | 369. 994 | .0405 |
| 45 F | 349. 228 | .0429 |
| 44 E | 329. 628 | .0455 |
| 43 Eb | 311. 127 | .0482 |
| 42 D | 293. 665 | .0510 |
| 41 C# | 277. 183 | .0541 |
| Middle 40 C | 261. 626 | .0573 |
| 39 B | 246. 942 | .0601 |
| 38 Bb | 233. 082 | .0643 |
| 37 A | 220. 00 | .0681 |
| 36 Ab | 207. 652 | .0722 |
| 35 G | 195. 998 | .0765 |
| 24 F# | 184. 997 | .0810 |
| 33 F | 174. 614 | .0859 |
| 32 E | 164. 814 | .0910 |
| 31 Eb | 155. 563 | .0864 |
| 30 D | 146. 832 | .1021 |
| 29 C# | 138. 591 | .1082 |
| 28 C | 130. 813 | .1146 |
| 27 B | 123. 471 | .1215 |
| 26 Bb | 116. 541 | .1287 |
| 25 A | 110. 000 | .1363 |
| 24 Ab | 103. 826 | .1445 |
| 23 G | 97. 999 | .1530 |
| 22 F# | 92. 499 | .1621 |
| 21 F | 87. 307 | .1718 |
| 20 E | 82. 407 | .1820 |
| 19 Eb | 77. 782 | .1928 |
| 18 D | 73. 416 | .2043 |
| 17 C# | 69. 296 | .2165 |
| 16 C | 65. 406 | .2293 |
| 15 B | 61. 735 | .2429 |
| 14 Bb | 58. 270 | .2574 |
| 13 A | 55. 000 | .2727 |
| 12 Ab | 51. 913 | .2889 |
| 11 G | 48. 999 | .3061 |
| 10 F# | 46. 249 | .3243 |
| 9 F | 43. 654 | .3436 |
| 8 E | 41. 203 | .3640 |
| 7 Eb | 38. 891 | .3857 |
| 6 D | 36. 708 | .4086 |
| 5 C# | 34. 648 | .4329 |
| 4 C | 32. 703 | .4586 |
| 3 B | 30. 863 | .4860 |
| 2 Bb | 29. 135 | .5148 |
| 1 A | 27. 5 | .5454 |

Similarly, the pitch of a thread for any other fundamental tone not in the equal tempered tuning system may be computed.

The tone quality or timbre of a musical tone depends upon the presence and intensity of harmonics. I have discovered that the tone quality of a tone recorded in accordance with this invention can be changed by changing the form and proportions of the thead on the rods.

The changes in tone quality resulting from the changes in the form and proportions of the thread may be heard audibly on playback and can also be seen visibly when displayed on an oscilloscope.

Thus, a circular form of thread results in a sine wave form and a tone quality essentially without harmonics resembling that of a tuning fork. Other forms and proportions of thread are possible. These can be developed by references to any mechanical handbooks and include the triangular, flattened high point, triangular rounded high point, the trapezoidal thread and groove, the square thread and groove, the buttress thread and groove, illustrated, respectively, in FIGS. 6, 7, 8 9, 10, 11. Other mechanical forms can be specially designed to produce desired tone qualities. The further changes in form are made by machining these forms through different machining processes.

The diameter of the threaded rod used for recording a note is not critically important, however, a narrow diameter of rod is preferred because it allows more parallel recordings on a multichannel tape. That is where the recording is to be done on 35 millimeter tape, 5 channels can easily be placed on the tape with rods having a diameter of less than a quarter inch. Actually it is possible to embed the threaded rod in non-magnetic plastic casing to permit more easy handling and use in recording.

Referring back to the diagram it should be noted that in recording the die is placed on a surface. Any kind of mechanical device which provides for holding a die is appropriate. The tape is then placed over the die and the permanent magnet, which can be mounted so as to develop a uniform mechanical motion, is moved uniformly longitudinally of the die.

Figure 3:
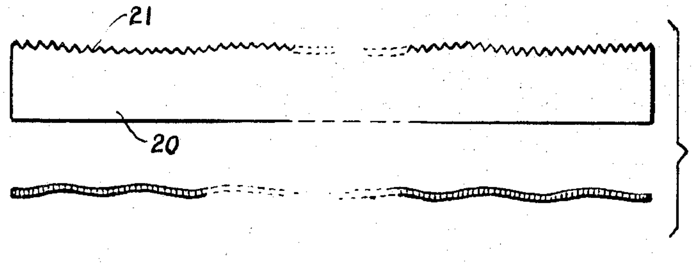
FIG. 3 is a section showing an embodiment of the magnetic pattern member of the invention.
Figure 4:
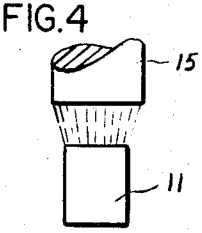
FIG. 4 is a detailed view of the die and magnets showing relationship of the active element in the production of the field of magnetic patterns corresponding to a definite musical note.

Referring now to a second embodiment of the magnetic pattern die of the invention, as shown in FIG. 3, it will be noted that the magnetic recording member may consist of a thin sheet of steel, magnetizable, of appropriate length, having one edge thereof serrated, as shown in the member 20, having a serrated edge 21. An element suitable for the presentation of a regular set of serrations and on a firm enough base can be in the form of a hacksaw blade. In such a device a variety of forms of serrations can be had, but the fundamental principle of the regular serrations completing a magnetic circuit through a tape held in fixed relation to the magnetic element as the magnet is moved thereover will develop appropriate musical tone based upon the spacing of the teeth.

A variation in tone quality can be had by the use of a finer tooth hacksaw blade, or a similar hacksaw blade having a wavy cutting edge therein, which blade is used for developing an appropriate kerf. Similarly where regular variations are worked into the structure of teeth the hacksaw blade provides a suitable pattern of serrations for developing a magnetic pattern on a tape used in conjunction therewith in accordance with the method of this invention.

Figure 5:
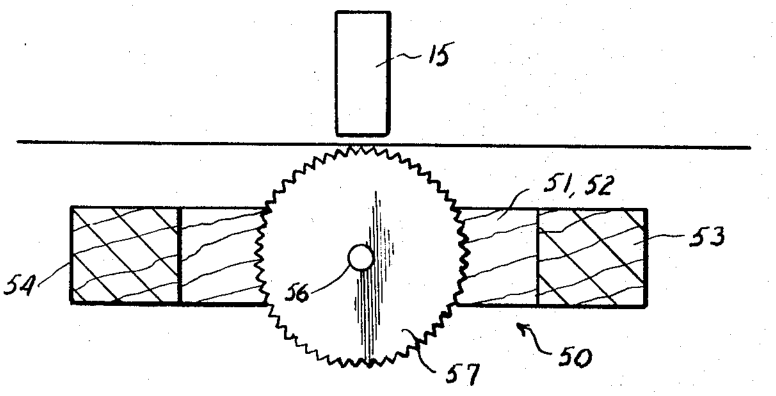
FIG. 5 is a view similar to FIG. 4, again illustrating a variation of the principle of producing a composite tone for recording purposes.
Figure 6:
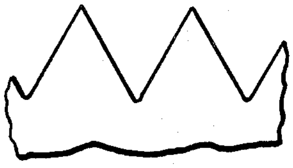
FIGS. 6, 7, 8, 9, 10 and 11 are representations of additional configurations in the die useful for generating tones.
Figure 7:
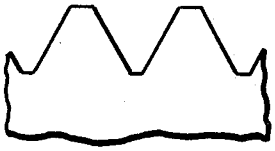
Figure 8:
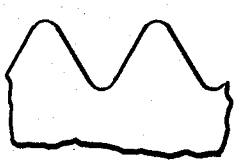
Figure 9:
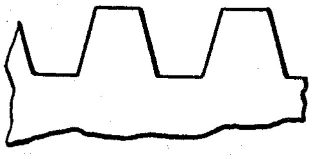
Figure 10:
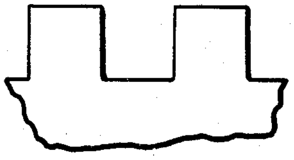
Figure 11:

Another embodiment of an apparatus for obtaining a magnetic pattern distributed and distributable on a recording tape is shown in FIG. 5 wherein 50 represents a support from which may be of any convenient length for mounting in an apparatus. The support consists of two sides, 51, 52, which constitute bearings with end supports 53 and 54. In the bearings axle 56 carries a toothed gear or a small element like a circular saw blade 57. The element is of a diameter such that it projects above sides 51, 52, and can be contacted by a recording tape, gently, so that it can be held in an appropriate track by side guides. Here the mechanics of recording are simply to hold the tape 14 to touch the surface of the outer points of the teeth sufficiently to cause the circular blade 57 to rotate as the tape is drawn over the teeth under the light compression of an applied permanent magnet. The magnetic circuit thus, from the magnet through the tape, into the teeth, and the movement of tape for any specific time interval will determine the length of the particular note which is recorded by the thus generated pattern.

The element 57 which is a toothed element suitable for developing a magnetic pattern on a tape as indicated can be a small saw blade or small gear tooth and the formula for selecting a particular size to be used is $$f=\frac{sn}{\pi d}$$

In the formula:

$f$ equals frequency,
$s$ equals tape speed in inches per second,
$n$ equals the number of teeth on the element,
$d$ is the diameter of the circle circumscribing the blade or the gear.

On this basis either the diameter needed for a particular frequency or the frequency to be obtained from a particular gear can be computed by solving the appropriate equation. For example, for a specific frequency such as 440 cycles per second and using 40 teeth, the equation becomes $$440=\frac{(15)(40)}{\pi d}$$

$d$=0.4340 inch

From the foregoing, in recapitulation, it will be seen that the method of recording sound on a tape in a single narrow track or multiple narrow tracks on a single tape can be used involving the static tape with moving magnet, or the moving tape with stationary magnet. The static tape involves the use of the die in which a threaded rod or the steel having a serrated edge, the threads or the serrations being related to the frequency of sound it is desired to generate and record at any particular tape speed. In the use of these where the element providing the magnetic pattern is of extended length the recording is essentially static tape, in that the tape is held in place in contact with the element and the permanent magnet moved along a given track accurately over the material providing the magnetic pattern. Thereby, a magnet circuit is completed between the moving magnet, the stationary tape and the stationary generating element to record on the tape a pattern responsive to that which is thus generated. The inverse is that which is illustrated in FIG. 5 wherein the magnet remains stationary and the generating element is a toothed element mounted on a stationary axle directly in line to form a completed magnetic circuit with the magnet. In this case the tape is moved between the magnet and the element and the movement of the tape places on record in the tape the magnetic pattern generated between permanent magnet and the rotating toothed element. It is important only in this method to have sufficient physical contact between the recording tape and the toothed element to develop movement or rotation of the toothed element so that the line thereof is properly recorded on the tape.

There are many advantages in recording in accordance with the invention herein in that the method provides a technique in which no die bases are needed. There is no complicated assembly of rods and the structure which defines the magnetic pattern generating the frequency is of a permanent variety. A great variety of tones is obtainable limited only by the ingenuity of the fabricator, the pitch of thread, the fineness of serration in the edges of steel, or the fineness of gear teeth in a gear. In view of the fact that many of the elements generate fundamental tones together with harmonics and are directly related to elements which are in common mass production it becomes an easy matter to assemble an appropriate set of dies for recording musical tones for educational and experimental demonstration purposes. Further in view of the fact that the magnetic pattern recording on a tape is actually quite narrow and precisely defined it becomes possible to permit the recording of a relatively large number of tracks on the specific magnetic tape without developing cross talk between tapes.

The inverse of the recording can be used as a method of measuring the pitch of a very fine screw thread, specifically this is done by recording the thread playing it back on a playback machine and determining the frequency of the fundamental musical tone and from this computing the pitch of the screw.

What is claimed is:

1. Apparatus for producing and recording musical sounds comprising a die representing a musical sound, said die being essentially composed of a base of magnetizable composition having regularly spaced high points thereon movable relative to a permanent magnet disposed in close proximity thereto to complete a magnetic circuit from said magnet through a recording tape to said die, said tape being held in a fixed linear relationship to said die.

2, Apparatus in accordance with claim 1 in which the die is linear in form.

3. Apparatus in accordance with claim 1 in which the die is circular in form.

4. In an apparatus in accordance with claim 2, a die consisting essentially of a magnetizable element formed of a thin magnetizable strip having uniformly spaced serrations in one edge thereof.

5. An apparatus in accordance with claim 2, wherein said die member is a threaded rod.

6. An apparatus in accordance with claim 3, wherein said die member is a toothed circular disk.

7. An apparatus for producing and recording musical sounds as defined in claim 4 the combination wherein the rods have a circular cross section and are threaded to provide a uniformly spaced serration.

8. In a means for producing and recording musical sounds as defined in claim 1, the combination in which the magnetic circuit is completed to a circular element having a regular pattern of spaced teeth in the outer circumference thereof.

References Cited

UNITED STATES PATENTS

| | | | |
|---|---|---|---|
| 2,586,664 | 2/1952 | Knoblaugh | 84—1.18 |
| 2,844,434 | 7/1958 | Beard | 346—74 |
| 2,854,310 | 9/1958 | Rehorn | 346—74 |
| 2,939,758 | 6/1960 | Crosman | 346—74 |

WARREN E. RAY, Primary Examiner

S. J. WITKOWSKI, Assistant Examiner

U.S. Cl. X.R.

84—1.28; 179—100.2